(12) United States Patent
Marushima et al.

(10) Patent No.: US 11,802,344 B2
(45) Date of Patent: **\*Oct. 31, 2023**

(54) SYSTEM AND METHOD FOR HYDROGEN PRODUCTION USING A CONTROL UNIT CONTROLLING AN ADJUSTMENT DEVICE

(71) Applicant: MITSUBISHI HEAVY INDUSTRIES, LTD., Tokyo (JP)

(72) Inventors: Shinya Marushima, Yokohama (JP); Atsushi Tsutsumi, Yokohama (JP); Yoshimasa Ando, Yokohama (JP); Kazunori Fujita, Yokohama (JP); Tadateru Tanioka, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/867,265

(22) Filed: Jul. 18, 2022

(65) Prior Publication Data

US 2022/0349068 A1 Nov. 3, 2022

Related U.S. Application Data

(62) Division of application No. 17/272,835, filed as application No. PCT/JP2019/032563 on Aug. 21, 2019, now Pat. No. 11,421,329.

(30) Foreign Application Priority Data

Sep. 7, 2018 (JP) ................................. 2018-167528

(51) Int. Cl.
*C25B 1/04* (2021.01)
*F01K 7/16* (2006.01)
(Continued)

(52) U.S. Cl.
CPC ............... *C25B 1/04* (2013.01); *C25B 15/02* (2013.01); *C25B 15/085* (2021.01); *F01K 7/16* (2013.01);
(Continued)

(58) Field of Classification Search
CPC ............................... F01K 25/005; C25B 1/04
See application file for complete search history.

(56) References Cited

U.S. PATENT DOCUMENTS 3,459,953 A 8/1969 Brauser
11,421,329 B2 * 8/2022 Marushima ............. C25B 15/02
(Continued)

FOREIGN PATENT DOCUMENTS

DE 10207791 9/2003
FR 2879854 6/2006
(Continued)

OTHER PUBLICATIONS

International Search Report dated Oct. 8, 2019 in International Application No. PCT/JP2019/032563 with English translation.
(Continued)

*Primary Examiner* — Laert Dounis
(74) *Attorney, Agent, or Firm* — Wenderoth, Lind & Ponack, L.L.P.

(57) ABSTRACT

A hydrogen production system includes: a hydrogen production device connected to an electric power system or connected to a power generation device using renewable energy and configured to produce hydrogen by electrolyzing pure water; an output control unit capable of controlling an amount of power supplied from the electric power system to the hydrogen production device according to request from the electric power system; a first pure water line for supplying pure water to the hydrogen production device; a first adjustment device capable of adjusting an amount of pure
(Continued)

water supplied to the hydrogen production device via the first pure water line; and a first control unit configured to control the first adjustment device, based on a power amount signal indicating information on an amount of power supplied from the electric power system to the hydrogen production device.

17 Claims, 9 Drawing Sheets

(51) Int. Cl.
*F01K 11/00* (2006.01)
*F01K 13/02* (2006.01)
*F01K 19/10* (2006.01)
*F01K 25/00* (2006.01)
*C25B 15/08* (2006.01)
*F22B 1/00* (2006.01)
*C25B 15/02* (2021.01)
*F22B 31/00* (2006.01)

(52) U.S. Cl.
CPC .............. *F01K 11/00* (2013.01); *F01K 13/02* (2013.01); *F01K 19/10* (2013.01); *F01K 25/005* (2013.01); *F22B 1/003* (2013.01); *F22B 31/0076* (2013.01); *Y02E 60/36* (2013.01); *Y02E 70/30* (2013.01)

(56) References Cited

U.S. PATENT DOCUMENTS

| | | |
|---|---|---|
| 2003/0230495 A1 | 12/2003 | Anderson |
| 2005/0198963 A1 | 9/2005 | Wai |
| 2006/0053792 A1 | 3/2006 | Bourgeois |
| 2007/0217995 A1 | 9/2007 | Matsumura et al. |
| 2009/0013940 A1 | 1/2009 | Rowan |
| 2011/0011110 A1 | 1/2011 | Hanson |
| 2015/0361833 A1 | 12/2015 | Hinders |
| 2016/0237858 A1 | 8/2016 | Bergins |
| 2019/0264582 A1 | 8/2019 | Hinders |
| 2022/0065162 A1 | 3/2022 | Hunt |

FOREIGN PATENT DOCUMENTS

| | | |
|---|---|---|
| JP | 2002-95167 | 3/2002 |
| JP | 5016972 | 6/2012 |
| JP | 2017-48076 | 3/2017 |
| JP | 2017-89916 | 5/2017 |
| JP | 2017-139850 | 8/2017 |
| WO | 2013/176032 | 11/2013 |

OTHER PUBLICATIONS

English translation of the Written Opinion of the International Searching Authority dated Oct. 8, 2019 in International Application No. PCT/JP2019/032563.

Extended European Search Report dated Aug. 25, 2021 in European Patent Application No. 19857163.0.

Office Action dated Apr. 26, 2022 in counterpart Japanese Patent Application No. 2018-167528, with English translation.

* cited by examiner

SYSTEM AND METHOD FOR HYDROGEN PRODUCTION USING A CONTROL UNIT CONTROLLING AN ADJUSTMENT DEVICE

TECHNICAL FIELD

The present disclosure relates to a hydrogen production system.

BACKGROUND

Patent Document 1 discloses a hydrogen production system that produces hydrogen by using the exhaust heat of an incinerator that incinerates waste. The hydrogen production system of Patent Document 1 includes an incinerator for incinerating waste, a pure water production device for producing pure water from raw water, a boiler for recovering heat of exhaust gas discharged from the incinerator and heating the pure water produced by the pure water production device to produce steam, a generator for generating power by using the steam, a water electrolysis device for electrolyzing the pure water produced by the pure water production device by using the power generated by the generator to produce hydrogen and oxygen, a hydrogen tank for storing the hydrogen, and an oxygen tank for storing the oxygen.

CITATION LIST

Patent Literature

Patent Document 1: JP2017-89916A

SUMMARY

Problems to be Solved

If the balance between supply and demand of electric power is lost due to the introduction of renewable energy or fluctuations in power demand in an electric power system, surplus power is generated, and the power is wasted.

In this regard, in the hydrogen production system disclosed in Patent Document 1, the surplus power of the electric power system is not absorbed although the generator is driven by steam produced using exhaust gas of the incinerator in the system and hydrogen is produced using power obtained from the generator.

At least one embodiment of the present invention was made in view of the above typical problem, and an object thereof is to provide a hydrogen production system that can absorb the surplus power of the electric power system.

Solution to the Problems (1) A hydrogen production system according at least one embodiment of the present invention comprises: a hydrogen production device connected to an electric power system and configured to produce hydrogen by electrolyzing pure water; an output control unit capable of controlling an amount of power supplied from the electric power system to the hydrogen production device according to request from the electric power system; a first pure water line for supplying pure water to the hydrogen production device; a first adjustment device capable of adjusting an amount of pure water supplied to the hydrogen production device via the first pure water line; and a first control unit configured to control the first adjustment device, based on a power amount signal indicating information on an amount of power supplied from the electric power system to the hydrogen production device.

With the above configuration (1), when surplus power is generated due to fluctuations in output of renewable energy or fluctuations in power demand in the electric power system, the surplus power of the electric power system is received by the hydrogen production device based on request from the electric power system, and the surplus electric power is used to electrolyze pure water to produce hydrogen.

Here, the amount of surplus power in the electric power system changes with fluctuations in output of renewable energy or fluctuations in power demand, etc. In this regard, in the above configuration (1), the first control unit controls the first adjustment device based on the power amount signal indicating information on the amount of power supplied from the electric power system to the hydrogen production device to adjust the amount of pure water supplied to the hydrogen production device.

Thus, since an appropriate amount of pure water is supplied to the hydrogen production device according to the amount of power supplied from the electric power system to the hydrogen production device, hydrogen can be efficiently produced by exhibiting the performance of the hydrogen production device while absorbing the surplus power of the electric power system. This contributes to the stabilization of the electric power system and the operation with less waste of electric power derived from renewable energy. Further, the use of power derived from renewable energy to produce hydrogen results in a reduction in $CO_2$ emissions.

(2) In some embodiments, in the above configuration (1), the hydrogen production system further comprises a power meter for measuring an amount of power supplied from the electric power system to the hydrogen production device. The power amount signal is an output signal of the power meter. The first control unit is configured to control the first adjustment device based on the output signal of the power meter.

With the above configuration (2), since the amount of pure water supplied from the first pure water line to the hydrogen production device is adjusted according to the amount of power supplied to the hydrogen production device as measured by the power meter, it is possible to supply an appropriate amount of pure water to the hydrogen production device according to the amount of power actually supplied from the electric power system to the hydrogen production device. Accordingly, hydrogen can be efficiently produced by effectively exhibiting the performance of the hydrogen production device.

(3) In some embodiments, in the above configuration (1), the power amount signal is a control signal by which the output control unit controls an amount of power supplied to the hydrogen production device. The first control unit is configured to control the first adjustment device based on the control signal of the output control unit.

With the above configuration (3), without using the power meter, it is possible to supply an appropriate amount of pure water to the hydrogen production device according to the amount of power supplied from the electric power system to the hydrogen production device. Accordingly, hydrogen can be efficiently produced by exhibiting the performance of the hydrogen production device with a simple configuration.

(4) In some embodiments, in any one of the above configurations (1) to (3), the first pure water line is connected to a second pure water line for supplying pure water to a steam cycle including a boiler and a steam turbine driven by steam of the boiler at a position downstream of the steam turbine and upstream of the boiler.

With the above configuration (4), one pure water production device can be used as the pure water production device for producing pure water supplied to the hydrogen production device and the pure water production device for producing pure water supplied to the boiler. As a result, compared with the case where the pure water production device for producing pure water supplied to the boiler and the pure water production device for producing pure water supplied to the hydrogen production device are separately provided, the facility configuration of the pure water production device can be simplified, and the facility cost and the operating cost can be reduced.

(5) In some embodiments, in the above configuration (4), the hydrogen production system further comprises a hydrogen line for supplying hydrogen produced by the hydrogen production device to the boiler.

With the above configuration (5), since the fuel mixed with hydrogen can be combusted in the boiler, it is possible to produce steam in the boiler by using hydrogen produced by the hydrogen production device and generate power by the generator connected to the steam turbine.

(6) In some embodiments, in the above configuration (5), the hydrogen production system further comprises a hydrogen storage device for storing hydrogen produced by the hydrogen production device, and a generator driven by the steam turbine is connected to the electric power system.

With the above configuration (6), hydrogen produced by the hydrogen production device using the surplus power of the electric power system can be stored in the hydrogen storage device, and during the time when the surplus power is not generated in the electric power system, hydrogen can be supplied from the hydrogen storage device to the boiler to generate power by the generator with the above method. This contributes to the stabilization of the electric power system and the effective use of renewable energy, resulting in a reduction in $CO_2$ emissions.

(7) In some embodiments, in any one of the above configurations (4) to (6), the hydrogen production system further comprises: a pure water production device configured to produce pure water by removing an impurity from raw water to supply pure water to the second pure water line; and a pure water tank for storing pure water produced by the pure water production device and disposed upstream of a connection position between the second pure water line and the first pure water line and downstream of the pure water production device.

With the above configuration (7), one pure water tank can be used as the pure water tank for supplying pure water to the hydrogen production device and the pure water tank for supplying pure water to the boiler. As a result, compared with the case where the pure water tank for supplying pure water to the boiler and the pure water tank for supplying pure water to the hydrogen production device are separately provided, the facility configuration of the pure water tank can be simplified, and the facility cost and the operating cost can be reduced. Further, even when the amount of pure water to be supplied to the hydrogen production device and the amount of pure water to be supplied to the boiler fluctuate, it is possible to flexibly respond to the fluctuation by discharging pure water stored in the pure water tank, and it is possible to simplify the facility configuration of the pure water production device.

(8) In some embodiments, in any one of the above configurations (4) to (6), the hydrogen production system further comprises: a second adjustment device capable of adjusting an amount of pure water supplied to the boiler via the second pure water line; and a second control unit configured to control the second adjustment device, based on a first signal indicating information on an amount of pure water supplied from the first pure water line to the hydrogen production device.

With the above configuration (8), the amount of pure water supplied to the boiler via the second pure water line can be appropriately adjusted in consideration of the amount of pure water supplied from the first pure water line to the hydrogen production device.

(9) In some embodiments, in the above configuration (8), the second control unit is configured to be able to execute a limit mode which limits an amount of pure water supplied from the second pure water line to the boiler such that supply of pure water to the hydrogen production device is prioritized over supply of pure water to the steam cycle.

With the above configuration (9), it is possible to effectively absorb the surplus power of the electric power system while generating power by the generator via the steam turbine to the extent possible.

(10) In some embodiments, in the above configuration (9), in the limit mode, the second control unit is configured to limit a period for supplying pure water to the steam cycle to a period during which supply of pure water to the hydrogen production device is stopped or to a period during which an amount of pure water supplied to the hydrogen production device is equal to or less than a reference amount.

With the above configuration (10), it is possible to avoid overlapping between the period for supplying pure water to the hydrogen production device and the period for supplying pure water to the steam cycle. Accordingly, it is possible to suppress an increase in the installation volume of the pure water production device and the pure water tank, and it is possible to reduce the facility cost and the operating cost of the hydrogen production system. In addition, it is possible to absorb the surplus power of the electric power system.

(11) In some embodiments, in the above configuration (9) or (10), the hydrogen production system further comprises: a pure water tank for storing pure water produced by a pure water production device, and a remaining amount detection unit for detecting a remaining amount of the pure water tank. The second control unit is configured to execute the limit mode when the remaining amount detected by the remaining amount detection unit falls below a reference value.

When the remaining amount of the pure water tank is small, the amount of pure water that can be supplied to the hydrogen production device and the boiler is small as compared with the case where the pure water tank has a sufficient remaining amount of pure water. Accordingly, as described in (9) or (10), if the limit mode is not executed when the remaining amount of the pure water tank exceeds the reference value while the limit mode is executed when the remaining amount falls below the reference value, it is possible to absorb the surplus power of the electric power system while efficiently producing hydrogen by the hydrogen production device and generating power by the generator.

(12) In some embodiments, in any one of the above configurations (8) to (11), the hydrogen production system further comprises: a blow-down water line for discharging blow-down water of the boiler; a blow-down water amount adjustment device for adjusting an amount of blow-down water discharged from the blow-down water line; and a blow-down water control unit configured to control the blow-down water amount adjustment device, based on a second signal indicating information on an amount of pure water supplied from the first pure water line to the hydrogen production device.

With the above configuration (12), the amount of blow-down water discharged from the blow-down water line can be appropriately adjusted in consideration of the amount of pure water supplied from the first pure water line to the hydrogen production device.

(13) In some embodiments, in the above configuration (12), the hydrogen production system further comprises a water meter for measuring an amount of the blow-down water discharged from the blow-down water line. The first signal is an output signal of the water meter. The second control unit is configured to control the second adjustment device based on the output signal of the water meter.

With the above configuration (13), an appropriate amount of pure water can be supplied to the boiler according to the amount of blow-down water discharged from the blow-down water line. Thus, it is possible to appropriately maintain the amount of pure water necessary for the steam cycle.

Advantageous Effects

At least one embodiment of the present invention provides a hydrogen production system that can absorb the surplus power of the power grid.

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise". "include", "have", "contain" and "constitute" are not intended to be exclusive of other components.

Figure 1:
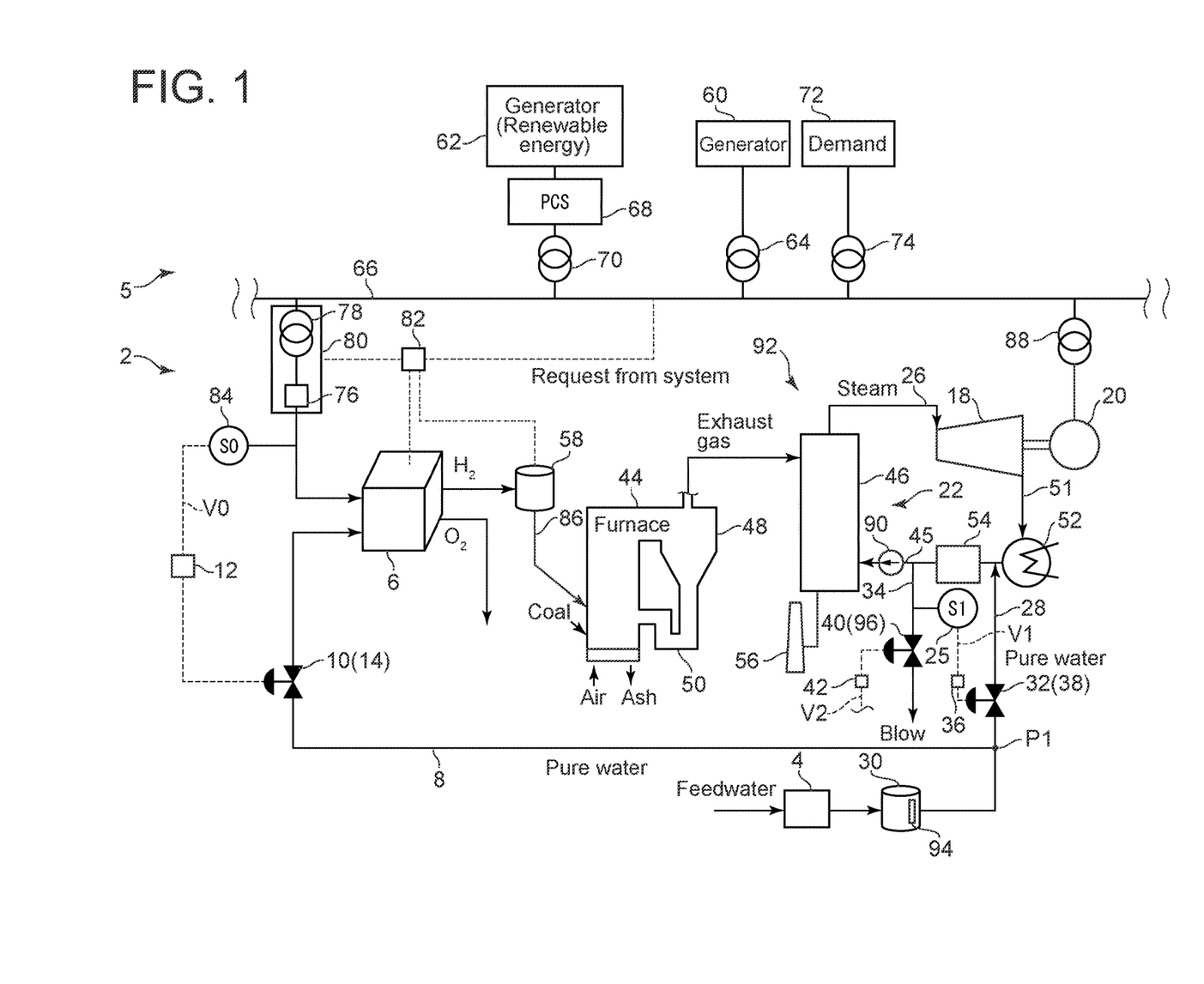
FIG. 1 is a schematic configuration diagram of a hydrogen production system 2 according to an embodiment.
Figure 2:
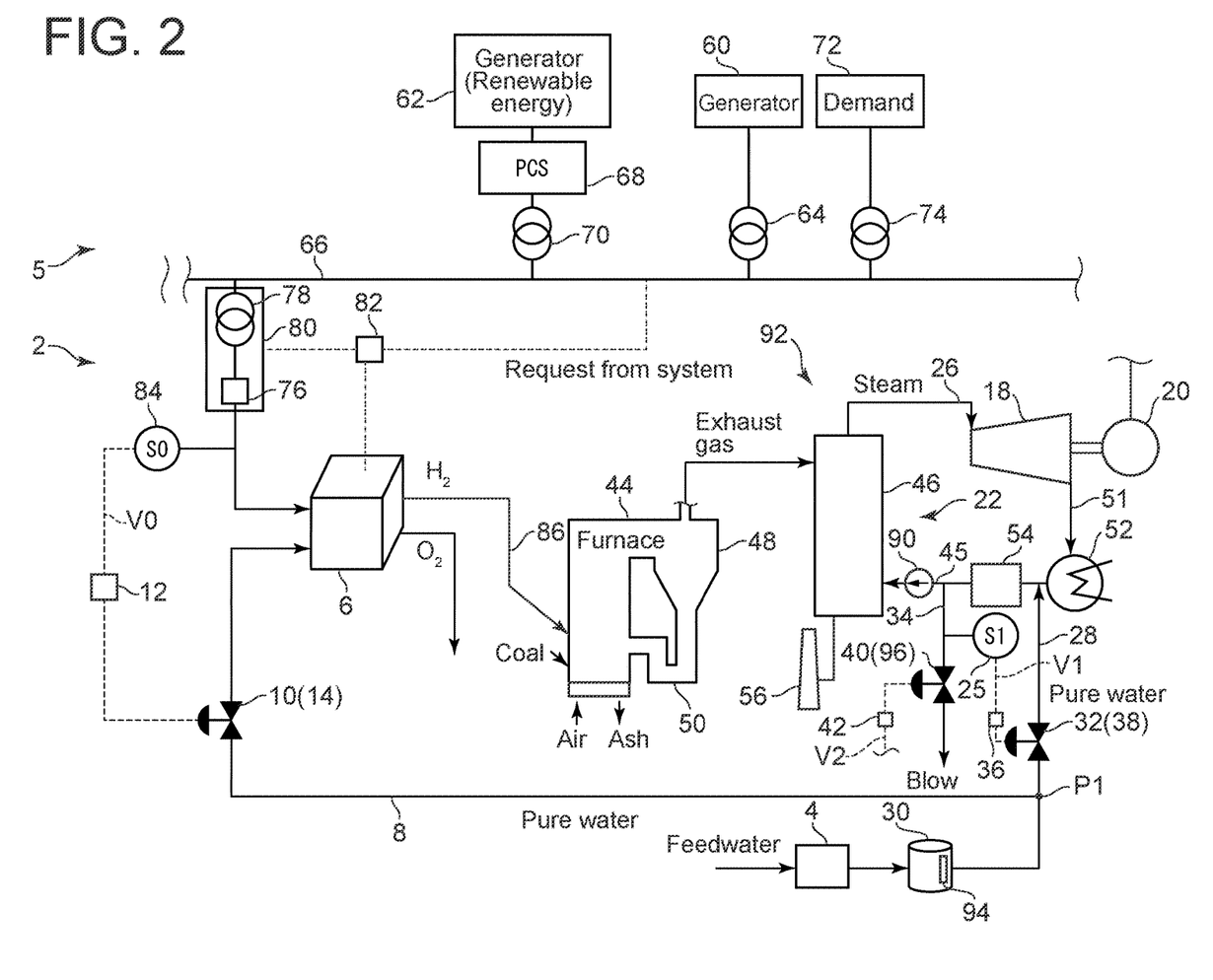
FIG. 2 is a schematic configuration diagram of a hydrogen production system 2 according to an embodiment.
Figure 3:
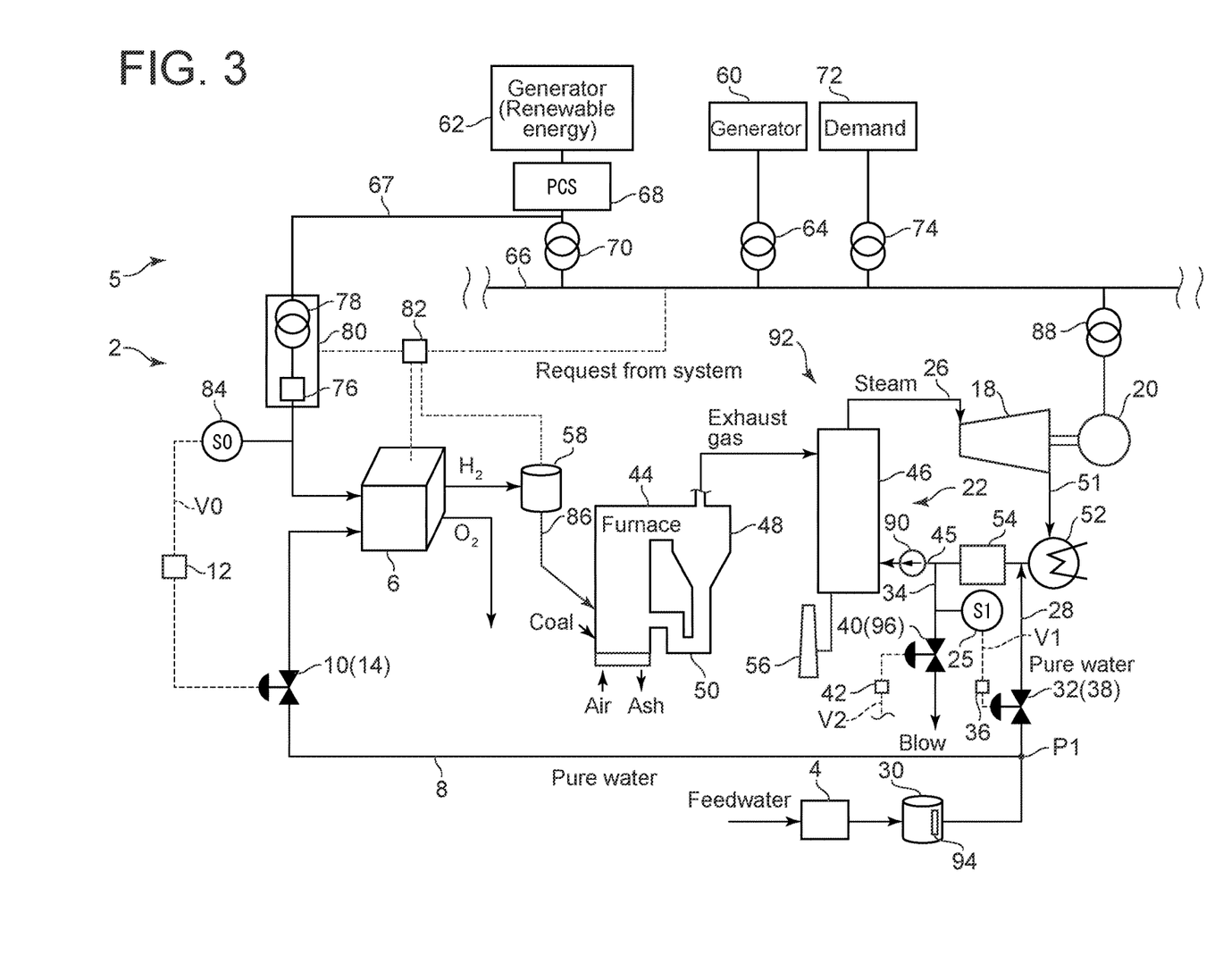
FIG. 3 is a schematic configuration diagram of a hydrogen production system 2 according to an embodiment.
Figure 4:
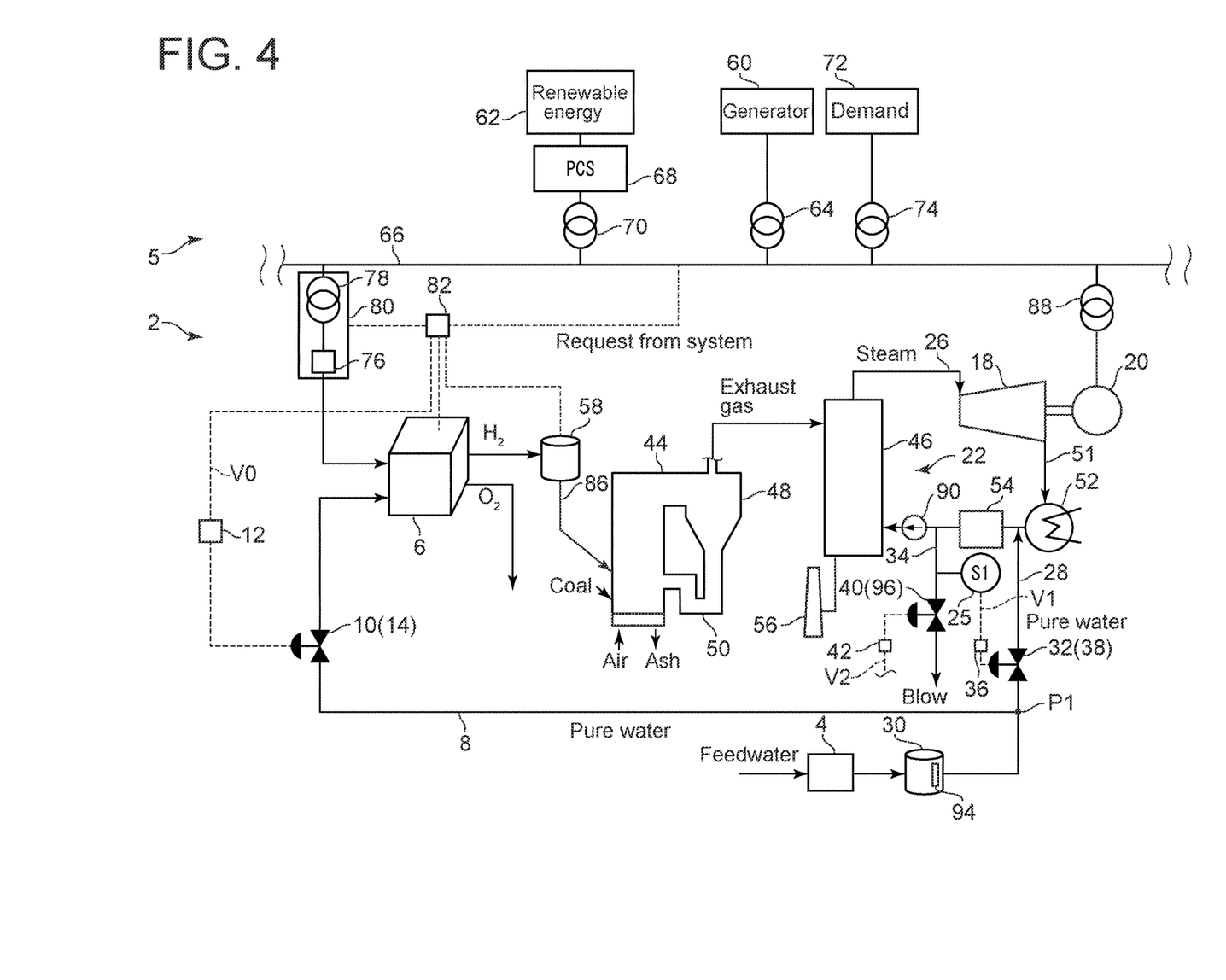
FIG. 4 is a schematic configuration diagram of a hydrogen production system 2 according to an embodiment.
Figure 5:
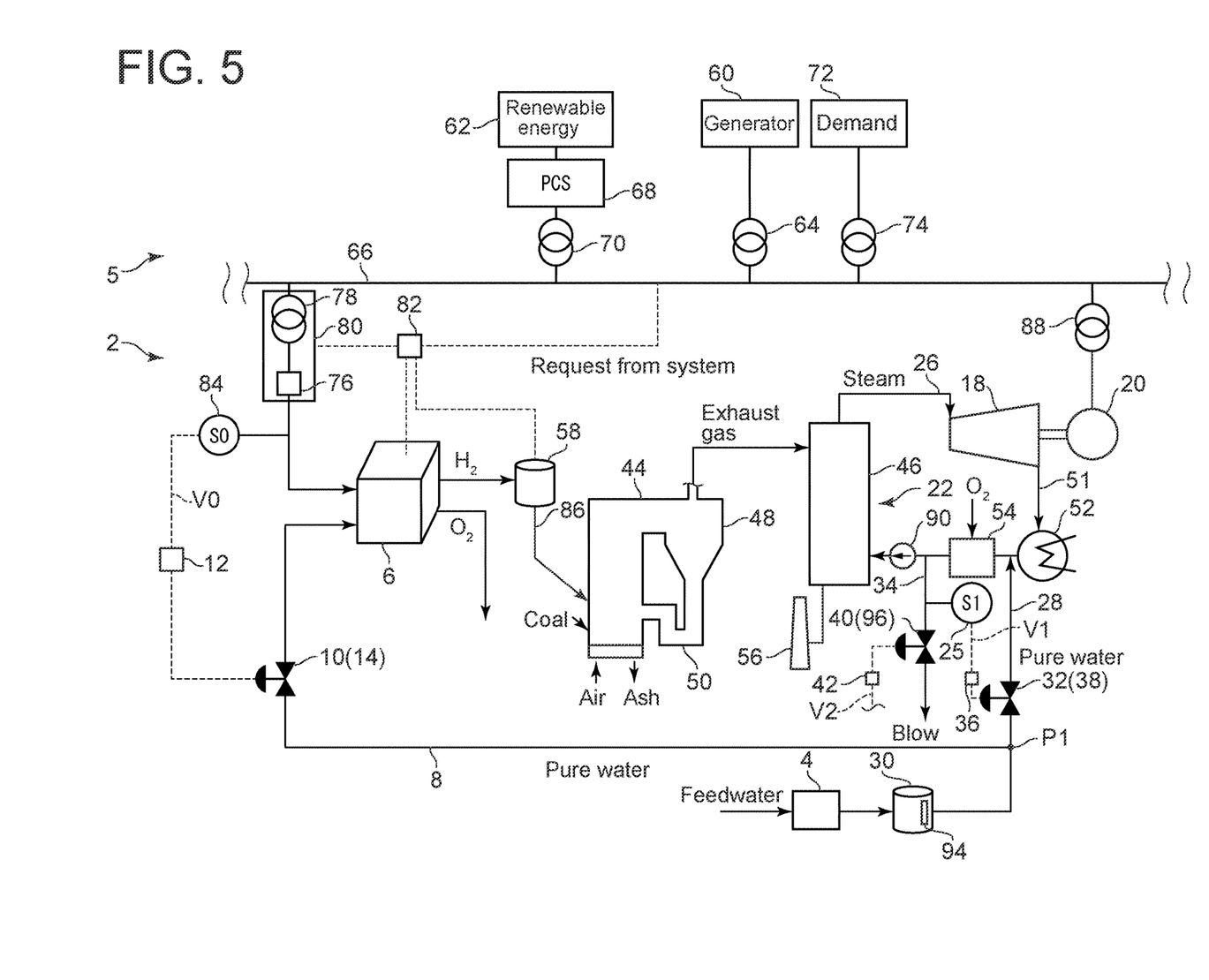
FIG. 5 is a schematic configuration diagram of a hydrogen production system 2 according to an embodiment.

FIG. 1 is a schematic configuration diagram of the hydrogen production system 2 according to an embodiment. FIG. 2 is a schematic configuration diagram of the hydrogen production system 2 according to an embodiment. FIG. 3 is a schematic configuration diagram of the hydrogen production system 2 according to an embodiment. FIG. 4 is a schematic configuration diagram of the hydrogen production system 2 according to an embodiment. FIG. 5 is a schematic configuration diagram of the hydrogen production system 2 according to an embodiment.

In some embodiments, an electric power system 5, to which the hydrogen production system 2 is connected, includes a generator 60 for generating power using depleting energy, such as thermal power generation and nuclear power generation, and a power generation device 62 for generating power using renewable energy, such as solar power generation and wind power generation. The amount of power generated using renewable energy may fluctuate depending on external environmental factors. The generator 60 is connected to a power grid 66 of the electric power system 5 via a transformer 64. The power generation device 62 is connected to the power grid 66 via a power conditioner (PCS: power conditioning system) 68 and a transformer 70. A power demander 72 is connected to the power grid 66 via a transformer 74.

In some embodiments, for example as shown in FIGS. 1 to 5, the hydrogen production system 2 includes a pure water production device 4, a hydrogen production device 6, a first pure water line 8, a first adjustment device 10, and a first control unit 12.

The pure water production device 4 is configured to produce pure water by removing impurities from raw water. The hydrogen production device 6 is connected to the electric power system 5 via a substation 80 and is configured to produce hydrogen by electrolyzing pure water using power received from the electric power system 5. The substation 80 includes an AC/DC converter 76 and a transformer 78. The transformer 78 adjusts the voltage of AC power supplied from the electric power system 5, and the AC/DC converter 76 converts the AC power into DC power. Then, the DC power is supplied to the hydrogen production device 6. In the illustrated embodiment, the hydrogen production system 2 includes an output control unit 82 capable of controlling the output of the hydrogen production device 6 according to request from the electric power system 5. The output control unit 82 controls the amount of power supplied from the electric power system 5 to the hydrogen production device 6 via the substation 80 according to request from the electric power system 5.

The first pure water line 8 is configured to supply pure water produced by the pure water production device 4 to the hydrogen production device 6. The first adjustment device 10 is configured to adjust the amount of pure water supplied to the hydrogen production device 6 via the first pure water line 8. The first control unit 12 is configured to control the first adjustment device 10, based on a power amount signal V0 indicating information on the amount of power supplied from the electric power system 5 to the hydrogen production device 6. In the illustrated embodiment, the first adjustment device 10 is a first valve 14 disposed in the first pure water line 8, and the first control unit 12 controls the opening degree of the valve 14 based on the power amount signal V0 to adjust the amount of pure water supplied to the hydrogen production device 6.

With this configuration, when surplus power is generated due to fluctuations in output of renewable energy or fluctuations in power demand in the electric power system 5, the surplus power of the electric power system 5 is received by the hydrogen production device 6 based on request from the electric power system 5, and the surplus power is used to electrolyze pure water to produce hydrogen.

Here, the amount of surplus power in the electric power system 5 changes with fluctuations in output of renewable energy or fluctuations in power demand, etc. In this regard, in the hydrogen production system 2, the first control unit 12 controls the first adjustment device 10, based on the power amount signal V0 indicating information on the amount of power supplied from the electric power system 5 to the hydrogen production device 6.

Thus, since an appropriate amount of pure water is supplied to the hydrogen production device 6 according to the amount of power supplied from the electric power system 5 to the hydrogen production device 6, hydrogen can be efficiently produced by exhibiting the performance of the hydrogen production device 6 while absorbing the surplus power of the electric power system 5. This contributes to the stabilization of the electric power system 5 and the operation with less waste of electric power derived from renewable energy. Further, the use of power derived from renewable energy to produce hydrogen results in a reduction in $CO_2$ emissions.

In some embodiments, for example as shown in FIGS. 1 to 3 and 5, the hydrogen production system 2 includes a power meter 84 for measuring the amount of power supplied from the electric power system 5 to the hydrogen production device 6. In this case, the power amount signal V0 is an output signal of the power meter 84. That is, the first control unit 12 controls the first adjustment device 10, based on the output signal of the power meter 84.

With this configuration, since the amount of pure water supplied from the first pure water line 8 to the hydrogen production device 6 is adjusted according to the amount of power supplied to the hydrogen production device 6 as measured by the power meter 84, it is possible to supply an appropriate amount of pure water to the hydrogen production device 6 according to the amount of power actually supplied from the electric power system 5 to the hydrogen production device 6. Accordingly, hydrogen can be efficiently produced by effectively exhibiting the performance of the hydrogen production device 6.

In some embodiments, for example as shown in FIG. 4, the power amount signal V0 is a control signal for controlling the output of the hydrogen production device 6 by the output control unit 82. That is, the first control unit 12 controls the first adjustment device 10 to adjust the amount of pure water supplied to the hydrogen production device 6, based on the control signal transmitted by the output control unit 82 for controlling the output of the hydrogen production device 6.

With this configuration, without using the power meter 84, it is possible to supply an appropriate amount of pure water to the hydrogen production device 6 according to the amount of power supplied from the electric power system 5 to the hydrogen production device 6. Accordingly, hydrogen can be efficiently produced by exhibiting the performance of the hydrogen production device 6 with a simple configuration.

In some embodiments, for example as shown in FIGS. 1, 2, 4, and 5, the hydrogen production device 6 is connected to the power grid 66 via the substation 80 and is connected to the power generation device 62 using renewable energy via the power grid 66. In this case, power obtained from the power generation device 62 using renewable energy is converted into high-voltage AC power via the power conditioner 68 and the transformer 70, transmitted through the power grid 66, converted into low-voltage DC power via the substation 80, and then supplied to the hydrogen production device 6. As a result, the surplus power of the electric power system 5 can be supplied to the hydrogen production device 6 via the power grid 66 with a small transmission loss.

In some embodiments, for example as shown in FIG. 3, the hydrogen production device 6 is directly connected to the power generation device 62 using renewable energy not via the power grid 66. In this case, power obtained from the power generation device 62 using renewable energy is converted into AC voltage via the power conditioner 68, transmitted through the power grid 67, converted into DC power via the substation 80, and then supplied to the hydrogen production device 6. As a result, the surplus power of the electric power system 5 can be directly supplied to the hydrogen production device 6 not via the high-voltage power grid 66 with a small transmission loss.

In some embodiments, for example as shown in FIGS. 1 to 5, the hydrogen production system 2 includes a steam cycle 92 including a boiler 22 and a steam turbine 18 driven by steam of the boiler 22, a generator 20 configured to be driven by the steam turbine 18, and a second pure water line 28 for supplying pure water produced by the pure water production device 4 to a position downstream of the steam turbine 18 and upstream of the boiler 22 in the steam cycle 92. The first pure water line 8 is connected to the second pure water line.

With this configuration, in the case where the hydrogen production device 6 for producing hydrogen and the boiler 22 for driving the steam turbine 18 connected to the generator 20 are included, one pure water production device can be used as the pure water production device 4 for producing pure water supplied to the hydrogen production device 6 and the pure water production device 4 for producing pure water supplied to the boiler 22. As a result, compared with the case where the pure water production device for producing pure water supplied to the boiler 22 and the pure water production device for producing pure water supplied to the hydrogen production device 6 are separately provided, the facility configuration of the pure water production device can be simplified, and the facility cost and the operating cost can be reduced.

In some embodiments, for example as shown in FIGS. 1 to 5, the hydrogen production system 2 includes a pure water tank 30, disposed upstream of a connection position P1 between the second pure water line 28 and the first pure water line 8 and downstream of the pure water production device 4, for storing pure water produced by the pure water production device 4.

With this configuration, one pure water tank can be used as the pure water tank 30 for supplying pure water to the hydrogen production device 6 and the pure water tank 30 for supplying pure water to the boiler 22. As a result, compared with the case where the pure water tank for supplying pure water to the boiler 22 and the pure water tank for supplying pure water to the hydrogen production device 6 are separately provided, the facility configuration of the pure water tank can be simplified, and the facility cost and the operating cost can be reduced. Further, even when the amount of pure water to be supplied to the hydrogen production device 6 and the amount of pure water to be supplied to the boiler 22 fluctuate, it is possible to flexibly respond to the fluctuation by discharging pure water stored in the pure water tank 30, and it is possible to simplify the facility configuration of the pure water production device 4.

In some embodiments, for example as shown in FIGS. 1 to 5, the boiler 22 includes a furnace 44 for combusting fuel and a heat exchanger 46 for producing steam by using exhaust gas discharged from the furnace 44. In the illustrated exemplary embodiment, the boiler 22 is a circulating fluidized bed boiler. The furnace 44 is configured to combust coal as the fuel, and the boiler 22 includes a cyclone 48 for collecting particles contained in exhaust gas produced by the combustion in the furnace 44 and guided to the cyclone 48, and an external heat exchanger 50 for recovering thermal energy of the particles in the exhaust gas collected by the cyclone 48. From the bottom of the furnace 44, air is supplied to the inside of the furnace 44, and ash is discharged to the outside of the furnace 44.

The steam produced by the heat exchanger 46 is supplied to the steam turbine 18 via a steam line 26, works in the steam turbine 18, and then is condensed by a condenser 52 through a condensate line 51 to form condensed water. The condensed water is, after passing through a water treatment device 54, boosted by a water supply pump 90 disposed in a water supply line 45, and is supplied to the heat exchanger 46 again. Thus, in the illustrated embodiment, the heat exchanger 46, the steam line 26, the steam turbine 18, the condensate line 51, the condenser 52, the water treatment device 54, the water supply line 45, and the water supply pump 90 constitute the steam cycle 92. The exhaust gas that has undergone heat exchange in the heat exchanger 46 is purified and then discharged from a stack 56.

The water treatment device 54 may perform combined water treatment (CWT) on feedwater, for example. The combined water treatment is a treatment in which oxygen is injected into feedwater to inactivate iron, and a protective film of hematite is formed on the surface of the base material of the system to prevent corrosion. In this case, as shown in FIG. 5, oxygen produced by electrolysis of water in the hydrogen production device 6 may be used for the combined water treatment by the water treatment device 54. Thus, by using oxygen which is a by-product of the hydrogen production device 6 for the water treatment, the cost for procuring oxygen can be reduced.

In some embodiments, for example as shown in FIGS. 1 to 5, the hydrogen production system 2 includes a hydrogen line 86 for supplying hydrogen produced by the hydrogen production device 6 to the furnace 44. With this configuration, since the fuel (coal in the illustrated embodiment) mixed with hydrogen can be combusted in the furnace 44, it is possible to produce steam in the boiler 22 by using hydrogen produced by the hydrogen production device 6 and generate power by the generator 20 connected to the steam turbine 18. In another embodiment, in the furnace 44, only hydrogen produced by the hydrogen production device 6 may be combusted as the fuel without using coal as the fuel.

In some embodiments, for example as shown in FIGS. 1 and 3 to 5, the hydrogen production system 2 includes a hydrogen storage device 58 disposed in the hydrogen line 86 so as to store hydrogen produced by the hydrogen production device 6. In this case, the generator 20 is connected to the power grid 66 of the electric power system 5 via a transformer 88.

With this configuration, hydrogen produced by the hydrogen production device 6 using the surplus power of the electric power system 5 can be stored in the hydrogen storage device 58, and during the time when the amount of power generated in the electric power system 5 is insufficient with respect to the power demand, hydrogen can be supplied from the hydrogen storage device 58 to the furnace 44 to generate power by the generator 20 with the above method. This contributes to the stabilization of the electric power system and the effective use of renewable energy, resulting in a reduction in $CO_2$ emissions. Even during the time when surplus power is generated in the electric power system, for example, if the power generation cost of fossil fuel is higher than the power generation cost of the generator 20 using hydrogen produced by the hydrogen production device 6, hydrogen may be used preferentially over fossil fuel to generate power.

Figure 6:
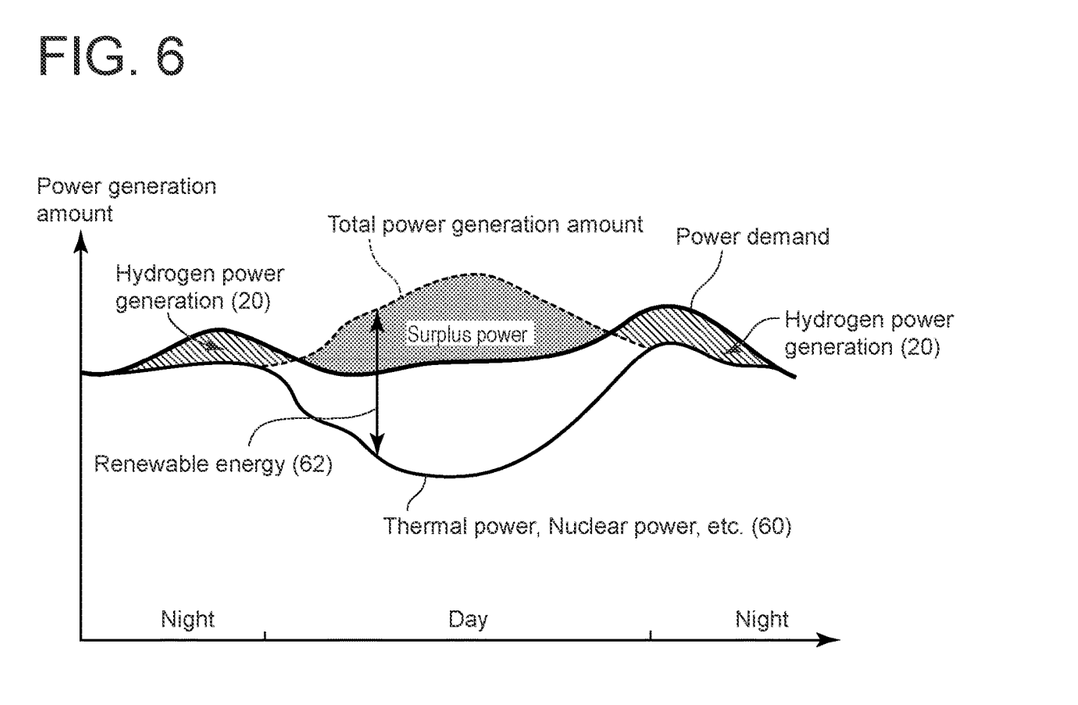
FIG. 6 is a diagram showing an example of one-day transition of the power generation amount of a generator 20, 60, the power generation amount of a power generation device 62, and the power demand in some embodiments shown in FIGS. 1 and 3 to 5.

FIG. 6 is a diagram showing an example of one-day transition of the power generation amount of the generator 20, 60, the power generation amount of the power generation device 62, and the power demand in some embodiments shown in FIGS. 1 and 3 to 5.

As shown in FIG. 6, in the daytime, the amount of power generated by the power generation device 62 using renewable energy including solar power generation increases, so that the total amount of power generation increases and exceeds the power demand, and surplus power is likely to be generated. Therefore, in the daytime when the surplus power is generated, the output control unit 82 performs control to supply the surplus power to the hydrogen production device 6 via the substation 80 to produce hydrogen and store the hydrogen in the hydrogen storage device 58, based on request from the electric power system 5.

At night when the output of solar power generation or the like is lost, power is generated by the generator 60 mainly using depleting energy, such as thermal power generation. The output control unit 82 performs control to cause the hydrogen produced in the daytime and stored in the hydrogen storage device 58 to be released from the hydrogen storage device 58 at night and supplied to the furnace 44 together with coal. Thus, the energy of hydrogen produced and stored in the daytime using renewable energy can be used to generate power by the generator 20 at night. This contributes to the stabilization of the electric power system and the effective use of renewable energy, resulting in a reduction in $CO_2$ emissions. In another embodiment, in the furnace 44, only hydrogen released from the hydrogen storage device 58 may be combusted as the fuel at night without using coal as the fuel.

In some embodiments, for example as shown in FIG. 2, the hydrogen production system 2 does not include the hydrogen storage device 58, and hydrogen produced by the hydrogen production device 6 is supplied to the furnace 44 via the hydrogen line 86 without storing the hydrogen. In this case, the generator 20 is not connected to the power grid 66 of the electric power system 5 but functions as a private generator.

With this configuration, since the generator 20 functions as a private generator which is not affected by the demand on the electric power system 5, hydrogen produced by the hydrogen production device 6 can be used in real time without storing hydrogen.

In some embodiments, for example as shown in FIGS. 1 to 5, the hydrogen production system 2 includes a second adjustment device 32 capable of adjusting the amount of pure water supplied to the boiler 22 via the second pure water line 28, and a second control unit 36 configured to control the second adjustment device 32, based on a first signal V1 indicating information on the amount of pure water supplied from the first pure water line 8 to the hydrogen production device 6. In the illustrated embodiment, the second adjustment device 32 is a valve 38 disposed in the second pure water line 28, and the second control unit 36 controls the opening degree of the valve 38 based on the first signal V1 to adjust the amount of pure water supplied to the boiler 22.

In some embodiments, for example as shown in FIGS. 1 to 5, the hydrogen production system 2 includes a blow-down water line 34 for discharging blow-down water of the boiler 22, a blow-down water amount adjustment device 40 for adjusting the amount of blow-down water discharged from the blow-down water line 34, and a blow-down water control unit 42 configured to control the blow-down water amount adjustment device 40, based on a second signal V2 indicating information on the amount of pure water supplied from the first pure water line 8 to the hydrogen production device 6.

In the illustrated embodiment, the blow-down water amount adjustment device 40 is a valve 96 disposed in the blow-down water line 34, and the blow-down water control unit 42 controls the opening degree of the valve 96 based on the second signal V2 to adjust the amount of blow-down water discharged from the blow-down water line 34. The second signal V2 may be, for example, the power amount signal V0 described above, or may be a signal indicating a measurement value of the amount of pure water supplied from the first pure water line 8 to the hydrogen production device 6.

In some embodiments, for example as shown in FIGS. 1 to 5, the hydrogen production system 2 includes a water meter 25 for measuring the amount of blow-down water discharged from the blow-down water line 34. The first signal V1 may be an output signal of the water meter 25 or the power amount signal V0, or may be a signal indicating a measurement value of the amount of pure water supplied from the first pure water line 8 to the hydrogen production device 6.

Figure 7:
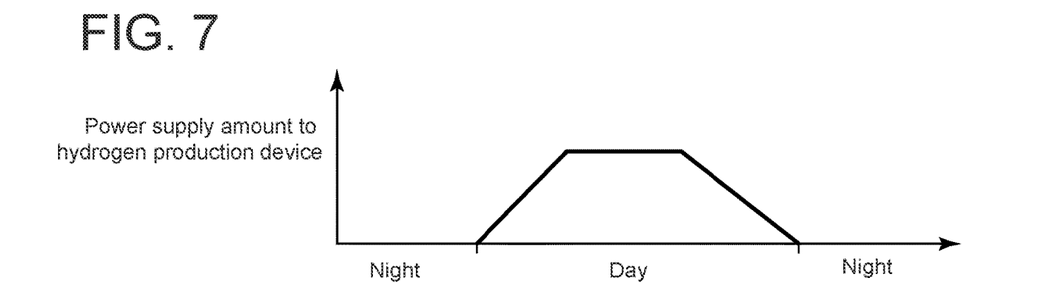
FIG. 7 is a diagram showing an example of one-day transition of the power supply amount to a hydrogen production device 6 in some embodiments shown in FIGS. 1 to 5.
Figure 8:
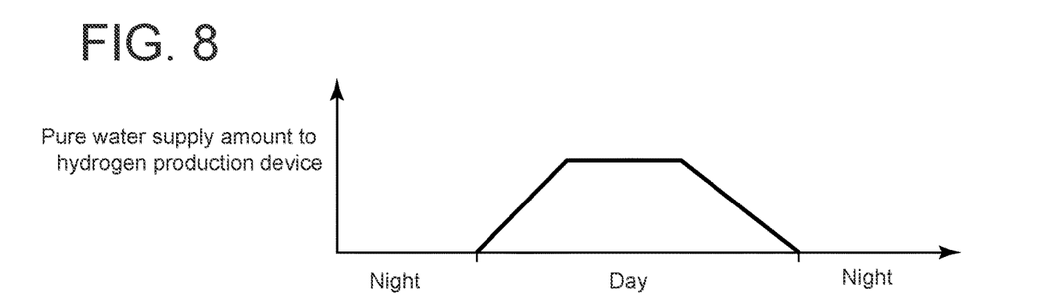
FIG. 8 is a diagram showing an example of one-day transition of the pure water supply amount to the hydrogen production device 6 corresponding to the one-day transition of the power supply amount shown in FIG. 7.
Figure 9:
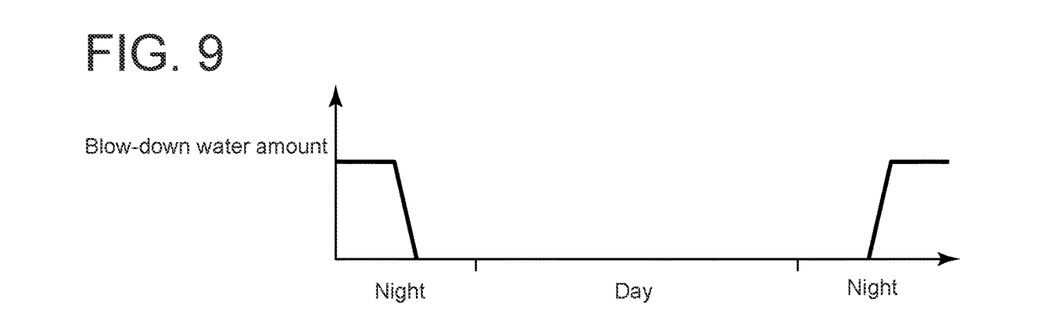
FIG. 9 is a diagram showing an example of one-day transition of the blow-down water amount of a boiler 22 corresponding to the one-day transition of the power supply amount shown in FIG. 7.
Figure 10:
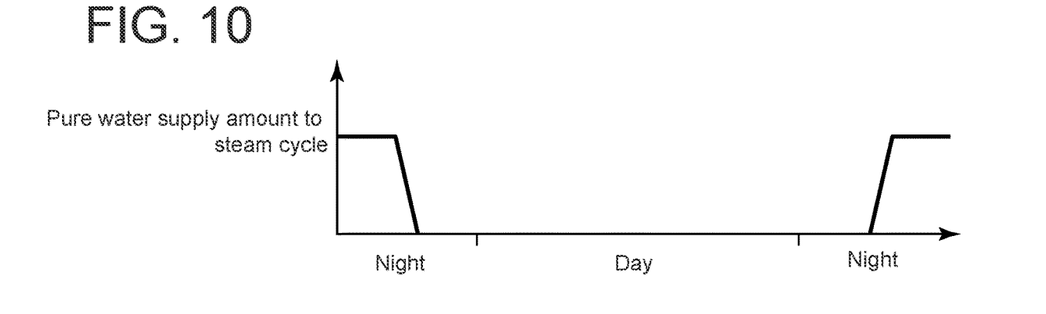
FIG. 10 is a diagram showing an example of one-day transition of the pure water supply amount to a steam cycle 92 corresponding to the one-day transition of the power supply amount shown in FIG. 7.

In the embodiments shown in FIGS. 1 to 5, control as shown in FIGS. 7 to 10 can be performed, for example. FIG. 7 is a diagram showing an example of one-day transition of the power supply amount to the hydrogen production device 6 in the embodiments shown in FIGS. 1 to 5. FIG. 8 is a diagram showing an example of one-day transition of the pure water supply amount to the hydrogen production device 6 corresponding to the one-day transition of the power supply amount shown in FIG. 7. FIG. 9 is a diagram showing an example of one-day transition of the blow-down water amount of the boiler 22 corresponding to the one-day transition of the power supply amount shown in FIG. 7. FIG. 10 is a diagram showing an example of one-day transition of the pure water supply amount to the steam cycle 92 corresponding to the one-day transition of the power supply amount shown in FIG. 7. The one-day transition of each amount shown in FIGS. 7 to 10 corresponds to the one-day transition of the power generation amount, etc., shown in FIG. 6.

As shown in FIGS. 7 and 8, in the daytime when the surplus power of the electric power system 5 tends to increase, power and pure water are supplied to the hydrogen production device 6 so as to absorb the surplus power, while in the nighttime when the surplus power of the electric power system 5 tends to decrease, the supply of power and pure water to the hydrogen production device 6 is stopped.

On the other hand, as shown in FIGS. 9 and 10, in the daytime when power and pure water are supplied to the hydrogen production device 6, the supply of pure water to the hydrogen production device 6 is prioritized over the supply of pure water to the steam cycle 92, so that pure water is not supplied to the steam cycle 92. Further, in the nighttime when the supply of power and pure water to the hydrogen production device 6 is stopped, blow-down water is discharged, and pure water is supplied to the steam cycle 92.

As described above, the second control unit 36 (see FIGS. 1 to 5) is configured to able to execute a limit mode which limits the amount of pure water supplied from the second pure water line 28 to the boiler 22 such that the supply of pure water to the hydrogen production device 6 is prioritized over the supply of pure water to the steam cycle 92. As a result, it is possible to effectively absorb the surplus power of the electric power system 5 while generating power by the generator 20 via the steam turbine 18 to the extent possible.

Further, in the limit mode, the second control unit 36 is configured to limit a period for supplying pure water to the steam cycle 92 to a period during which the supply of pure water to the hydrogen production device 6 is stopped or to a period during which the amount of pure water supplied to the hydrogen production device 6 is equal to or less than a reference amount. With this configuration, it is possible to avoid overlapping between the period for supplying pure water to the hydrogen production device 6 and the period for supplying pure water to the steam cycle 92. Accordingly, it is possible to suppress an increase in the installation volume of the pure water production device 4 and the pure water tank 30, and it is possible to reduce the facility cost and the operating cost of the hydrogen production system 2. In addition, it is possible to absorb the surplus power of the electric power system 5. Further, in a typical boiler 22, since the blow-down water of the boiler 22 is discharged, for example, only once a day, even when the supply of pure water to the hydrogen production device 6 is prioritized over the discharge of blow-down water of the boiler 22 and the supply of pure water to the steam cycle 92, the steam cycle 92 can be operated satisfactorily.

In some embodiments, for example as shown in FIGS. 1 to 5, the hydrogen production system 2 includes a remaining amount detection unit 94 for detecting the remaining amount of the pure water tank 30, and the second control unit 36 is configured to, when the remaining amount of the pure water tank 30 detected by the remaining amount detection unit 94 exceeds a reference value, not execute the limit mode, and when the remaining amount of the pure water tank 30 detected by the remaining amount detection unit 94 falls below the reference value, execute the limit mode. The remaining amount detection unit 94 may be, for example, a water level meter.

When the remaining amount of the pure water tank 30 is small, the amount of pure water that can be supplied to the hydrogen production device 6 and the boiler 22 is small as compared with the case where the pure water tank 30 has a sufficient remaining amount of pure water. Accordingly, as described above, if the limit mode is not executed when the remaining amount of the pure water tank 30 exceeds the reference value while the limit mode is executed when the remaining amount falls below the reference value, it is possible to absorb the surplus power of the electric power system while efficiently producing hydrogen by the hydrogen production device and generating power by the generator.

Figure 11:
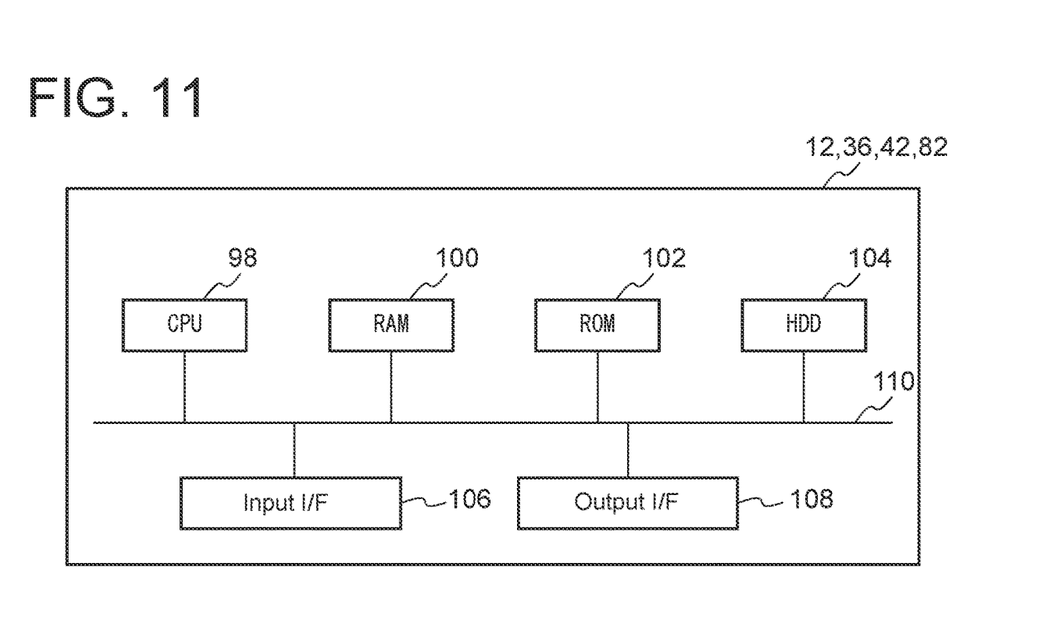
FIG. 11 is a diagram showing a hardware configuration of each of an output control unit 82, a first control unit 12, a second control unit 36, and a blow-down water control unit 42.

FIG. 11 is a diagram showing a hardware configuration of each of the output control unit 82, the first control unit 12, the second control unit 36, and the blow-down water control unit 42. Since the outlines of the hardware configurations of the respective control units are the same, the same reference numerals are used in FIG. 11 for convenience. Each control unit is implemented by a computer including a central processing unit (CPU) 98, a random access memory (RAM) 100, a read only memory (ROM) 102, a hard disk drive (HDD) 104, an input I/F 106, and an output IF 108, which are connected via a bus 110. The hardware configuration of each control unit is limited thereto, and may be configured by a combination of a control circuit and a storage device. Further, each control unit is implemented by executing a program that realizes each function of the control unit by the computer. The function of each control unit described below is realized by, for instance, loading a program stored in the ROM 102 into the RAM 100 and executing the program by the CPU 98, and reading and writing data in the RAM 100 or the ROM 102.

The present invention is not limited to the embodiments described above, but includes modifications to the embodiments described above, and embodiments composed of combinations of those embodiments.

For example, in the above-described embodiments, the circulating fluidized bed boiler including the furnace 44 and the heat exchanger 46 has been described as an example of the means for producing steam. However, the means for producing steam is not limited to the above-described embodiments, and may be, for example, a pulverized coal-fired boiler, a natural gas-fired boiler, or a heavy crude oil-fired boiler, or may be a combination of a gas turbine 112 and a heat recovery steam generator 114 (HRSG) in a gas turbine combined cycle (GTCC) as shown in FIG. 12.

Figure 12:
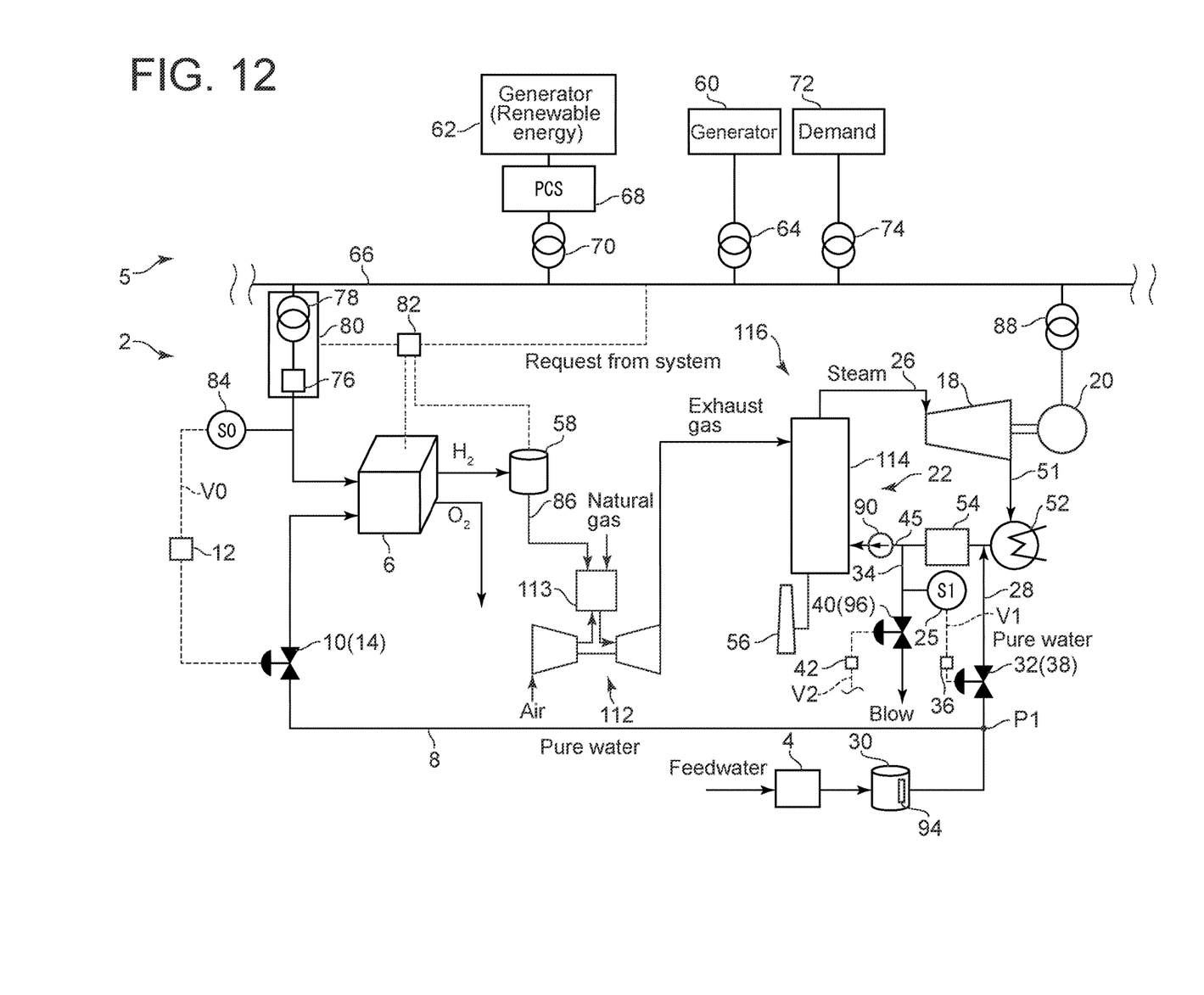
FIG. 12 is a schematic configuration diagram of a hydrogen production system 2 according to an embodiment.

In the embodiment shown in FIG. 12, hydrogen produced by the hydrogen production device 6 is supplied to the gas turbine 112 via the hydrogen storage device 58, mixed with natural gas, and combusted by a combustor 113 of the gas turbine 112. Further, feedwater supplied to the heat recovery steam generator 114 via the water supply line 45 evaporates due to exhaust heat of the gas turbine 112 in the heat recovery steam generator 114 to form steam, and is supplied to the steam turbine 18. In this case, the second pure water line 28 is configured to supply pure water to a position downstream of the steam turbine 18 and upstream of the heat recovery steam generator 114 in a steam cycle 116 including the heat recovery steam generator 114 and the steam turbine 18 driven by steam of the heat recovery steam generator 114.

In another embodiment, in the combustor 113 of the gas turbine 112, only hydrogen produced by the hydrogen production device 6 may be combusted as the fuel without using natural gas as the fuel.

REFERENCE SIGNS LIST

2 Hydrogen production system
4 Pure water production device
5 Electric power system
6 Hydrogen production device
8 First pure water line
10 First adjustment device
12 First control unit
14 First valve
18 Steam turbine
20 Generator
22 Boiler
25 Water meter
26 Steam line
28 Second pure water line
30 Pure water tank
32 Second adjustment device
34 Blow-down water line
36 Second control unit
38 Second valve
34 Blow-down water amount adjustment device
42 Blow-down water control unit
44 Furnace
45 Water supply line
46 Heat exchanger
48 Cyclone
50 External heat exchanger
51 Condensate line
52 Condenser
54 Water treatment device
56 Stack
58 Hydrogen storage device
60 Generator
62 Power generation device
64, 70, 74, 78, 88 Transformer
66 Power grid
68 Power conditioner
72 Demander
76 AC/DC converter
80 Substation
82 Output control unit
84 Power meter
86 Hydrogen line
90 Water supply pump
92 Steam cycle
94 Remaining amount detection unit
96 Valve
98 CPU
100 RAM
102 ROM
104 HDD
106 Input I/F
108 Output I/F
110 Bus
112 Gas turbine
113 Combustor
114 Heat recovery steam generator
116 Steam cycle

The invention claimed is:

1. A hydrogen production system comprising:
a hydrogen production device connected to an electric power system or connected to a power generation device using renewable energy not via the electric power system and configured to produce hydrogen by electrolyzing pure water;
an output control unit capable of controlling an amount of power supplied from the electric power system or the power generation device to the hydrogen production device;
a first pure water line for supplying pure water to the hydrogen production device;
a first adjustment device capable of adjusting an amount of pure water supplied to the hydrogen production device via the first pure water line; and
a first control unit configured to control the first adjustment device, based on a power amount signal indicating information on an amount of power supplied from the electric power system or the power generation device to the hydrogen production device.

2. The hydrogen production system according to claim 1, wherein the power amount signal is a control signal by which the output control unit controls an amount of power supplied to the hydrogen production device, and
wherein the first control unit is configured to control the first adjustment device based on the control signal of the output control unit.

3. The hydrogen production system according to claim 1, further comprising:
a boiler for producing steam by combusting fuel;
a steam turbine driven by steam of the boiler;
a generator connected to the steam turbine; and
a hydrogen line for supplying hydrogen produced by the hydrogen production device to the boiler,
wherein the first pure water line is connected to a second pure water line for supplying pure water to a steam cycle including the boiler and the steam turbine at a position downstream of the steam turbine and upstream of the boiler.

4. The hydrogen production system according to claim 1, further comprising a hydrogen storage device for storing hydrogen produced by the hydrogen production device,
wherein the hydrogen production device is configured to produce hydrogen using surplus power from the electric power system or the power generation device, and the hydrogen produced using surplus power is stored in the hydrogen storage device.

5. The hydrogen production system according to claim 3, further comprising a hydrogen storage device for storing hydrogen produced by the hydrogen production device,
wherein hydrogen stored in the hydrogen storage device is supplied to the boiler at night to use steam produced by the boiler to drive the steam turbine and cause the generator to generate power.

6. The hydrogen production system according to claim 3, wherein the generator functions as a private generator.

7. The hydrogen production system according to claim 3, further comprising:
a condenser for condensing steam from the steam turbine; and
a water treatment device disposed in a passage for returning water from the condenser to the boiler,
wherein oxygen which is a by-product of the hydrogen production device is injected into water from the condenser in the water treatment device.

8. The hydrogen production system according to claim 3, further comprising:
a second adjustment device capable of adjusting an amount of pure water supplied to the boiler via the second pure water line; and
a second control unit configured to control the second adjustment device, based on a first signal indicating information on an amount of pure water supplied from the first pure water line to the hydrogen production device.

9. The hydrogen production system according to claim 8, wherein the second control unit is configured to be able to execute a limit mode which limits an amount of pure water supplied from the second pure water line to the boiler such that supply of pure water to the hydrogen production device is prioritized over supply of pure water to the steam cycle.

10. The hydrogen production system according to claim 9, wherein, in the limit mode, the second control unit is configured to limit a period for supplying pure water to the steam cycle to a period during which supply of pure water to the hydrogen production device is stopped or to a period during which an amount of pure water supplied to the hydrogen production device is equal to or less than a reference amount.

11. The hydrogen production system according to claim 9, further comprising:
a pure water tank for storing pure water produced by a pure water production device; and
a remaining amount detector for detecting a remaining amount of the pure water tank,
wherein the second control unit is configured to execute the limit mode when the remaining amount detected by the remaining amount detector falls below a reference value.

12. The hydrogen production system according to claim 8, further comprising:
a blow-down water line for discharging blow-down water of the boiler;
a blow-down water amount adjustment device for adjusting an amount of blow-down water discharged from the blow-down water line; and
a blow-down water control unit configured to control the blow-down water amount adjustment device, based on a second signal indicating information on an amount of pure water supplied from the first pure water line to the hydrogen production device.

13. The hydrogen production system according to claim 12, further comprising a water meter for measuring an amount of the blow-down water discharged from the blow-down water line,
wherein the first signal is an output signal of the water meter, and
wherein the second control unit is configured to control the second adjustment device based on the output signal of the water meter.

14. The hydrogen production system according to claim 1, further comprising:
a gas turbine configured to operate by combusting hydrogen produced by the hydrogen production device;
a heat recovery steam generator for recovering heat of exhaust gas of the gas turbine;
a steam turbine driven by steam of the heat recovery steam generator;
a generator connected to the steam turbine; and
a hydrogen line for supplying hydrogen produced by the hydrogen production device to the gas turbine, wherein the first pure water line is connected to a second pure water line for supplying pure water to a steam cycle including the heat recovery steam generator and the steam turbine at a position downstream of the steam turbine and upstream of the heat recovery steam generator.

15. The hydrogen production system according to claim 14,
wherein only hydrogen produced by the hydrogen production device is used as fuel of the gas turbine.

16. The hydrogen production system according to claim 3,
wherein only hydrogen produced by the hydrogen production device is used as fuel of the boiler.

17. A hydrogen production method for producing hydrogen by electrolyzing pure water with a hydrogen production device by using power from an electric power system or a power generation device using renewable energy, the method comprising:
   a step of acquiring a signal from the electric power system or the power generation device;
   a step of controlling an amount of power supplied from the electric power system or the power generation device to the hydrogen production device, based on the signal; and
   a step of controlling an amount of pure water supplied to the hydrogen production device based on a power amount signal indicating information on the amount of power supplied to the hydrogen production device.

* * * * *